(12) United States Patent
Kotipalli et al.

(10) Patent No.: US 11,606,267 B1
(45) Date of Patent: Mar. 14, 2023

(54) DETECTING AND QUANTIFYING LATENCY COMPONENTS IN ACCESSING CLOUD SERVICES

(71) Applicant: Microsoft Technology Licensing, LLC, Redmond, WA (US)

(72) Inventors: Srinivasachakrapani Kotipalli, Sammamish, WA (US); Brad Rutkowski, Woodinville, WA (US); Paul James Andrew, Redmond, WA (US); Konstantin Ryvkin, Bellevue, WA (US); Chittaranjan Sadanand Pattekar, Redmond, WA (US); Saurabh Vats, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/471,456

(22) Filed: Sep. 10, 2021

(51) Int. Cl.
*H04L 41/5025* (2022.01)
*H04L 43/0852* (2022.01)
*H04L 43/04* (2022.01)
*H04L 41/5006* (2022.01)
*H04L 41/0631* (2022.01)

(52) U.S. Cl.
CPC ........ *H04L 41/5025* (2013.01); *H04L 41/065* (2013.01); *H04L 41/5006* (2013.01); *H04L 43/04* (2013.01); *H04L 43/0852* (2013.01)

(58) Field of Classification Search
CPC .............. H04L 41/5025; H04L 41/065; H04L 41/5006; H04L 43/04; H04L 43/0852
USPC ....................................................... 709/224
See application file for complete search history.

(56) References Cited

U.S. PATENT DOCUMENTS

| | | | |
|---|---|---|---|
| 8,059,557 B1 | 11/2011 | Sigg et al. | |
| 9,753,669 B2 | 9/2017 | Ben-Shaul et al. | |
| 10,644,954 B1* | 5/2020 | Pinos | H04L 43/045 |
| 10,728,117 B1 | 7/2020 | Sharma et al. | |
| 10,992,576 B1 | 4/2021 | Panchal et al. | |
| 11,178,252 B1* | 11/2021 | Devta | G06F 9/5083 |
| 11,212,354 B1* | 12/2021 | Pilkauskas | H04L 67/2895 |
| 11,219,034 B1* | 1/2022 | Dunsmore | H04W 72/048 |
| 11,223,538 B1* | 1/2022 | Arumugam | H04L 41/147 |
| 11,310,155 B1* | 4/2022 | Qian | H04L 45/123 |
| 11,350,294 B1* | 5/2022 | Balmakhtar | H04W 24/04 |
| 11,366,456 B2* | 6/2022 | Celia | G06N 3/02 |
| 2019/0104032 A1* | 4/2019 | Du | H04L 41/5054 |
| 2019/0140933 A1* | 5/2019 | Guim Bernat | H04L 47/2425 |

(Continued)

OTHER PUBLICATIONS

"Optimizing Application Latency with Load Balancing". Retrieved from: https://cloud.google.com/load-balancing/docs/tutorials/optimize-app-latency, Aug. 22. 2018, 15 Pages.

(Continued)

*Primary Examiner* — Melvin H Pollack
(74) *Attorney, Agent, or Firm* — Christopher J. Volkmann; Kelly, Holt & Christenson, PLLC

(57) ABSTRACT

A latency processing system detects traffic at a cloud service end point and analyzes packets in the detected traffic to identify a network configuration of a client that is accessing the cloud service. Latency components corresponding to different parts of the network configuration are identified and quantified. A recommendation engine is controlled to generate and surface an output indicative of recommendations for reducing network latency.

20 Claims, 9 Drawing Sheets

(56) References Cited

U.S. PATENT DOCUMENTS

| | | | | |
|---|---|---|---|---|
| 2019/0141119 A1* | 5/2019 | Bernat | | H04L 41/12 |
| 2019/0199611 A1* | 6/2019 | Kotadia | | G06F 9/547 |
| 2019/0222518 A1* | 7/2019 | Bernat | | H04L 67/1008 |
| 2019/0229990 A1* | 7/2019 | Patel | | H04L 41/0816 |
| 2019/0253274 A1* | 8/2019 | Van Dussen | | H04L 12/4641 |
| 2020/0145337 A1* | 5/2020 | Keating | | G06F 9/5011 |
| 2020/0252343 A1 | 8/2020 | Popescu et al. | | |
| 2021/0029204 A1* | 1/2021 | Bhatnagar | | H04L 41/0813 |
| 2021/0044503 A1* | 2/2021 | Zhang | | H04L 41/5025 |
| 2021/0075729 A1* | 3/2021 | Fedorov | | G06F 17/11 |
| 2021/0129619 A1 | 5/2021 | Colenbrander | | |
| 2021/0160165 A1 | 5/2021 | Zhu | | |
| 2021/0168027 A1 | 6/2021 | Parulkar et al. | | |
| 2021/0328933 A1* | 10/2021 | Thyagaturu | | H04L 41/40 |
| 2021/0352138 A1* | 11/2021 | Kodavanty | | H04L 67/563 |
| 2021/0392074 A1* | 12/2021 | Marichetty | | H04L 45/70 |
| 2021/0397940 A1* | 12/2021 | Schneider | | G06N 3/049 |
| 2021/0409335 A1* | 12/2021 | Zhu | | H04L 47/24 |
| 2022/0030051 A1* | 1/2022 | Mašnauskas et al. | | H04L 63/029 |
| 2022/0035684 A1* | 2/2022 | Gupte | | G06F 9/5083 |
| 2022/0061059 A1* | 2/2022 | Dunsmore | | H04W 72/048 |
| 2022/0100599 A1* | 3/2022 | Abuelela | | G06F 11/3664 |
| 2022/0200892 A1* | 6/2022 | Pandey | | H04L 45/123 |

OTHER PUBLICATIONS

Withee, et al., "Optimize Traffic Flow with Azure Active Directory Application Proxy", Retrieved from: https://docs.microsoft.com/en-us/azure/active-directory/app-proxy/application-proxy-network-topology, Apr. 27, 2021, 11 Pages.

"International Search Report and Written Opinion Issued in PCT Application No. PCT/US22/037119", dated Oct. 17, 2022, 11 Pages.

* cited by examiner

DETECTING AND QUANTIFYING LATENCY COMPONENTS IN ACCESSING CLOUD SERVICES

BACKGROUND

Computer systems are currently in wide use. Some computer systems are cloud-based systems that host cloud services. The cloud services can be accessed by client computing systems that may be deployed in a variety of different configurations.

Some client computing systems belong to a tenant that may have multiple different branches located in different geographic locations (such as in different cities). The different branches may have computing systems that access cloud services through a proxy service provider that is located at one of the branches. The different branches may access the cloud services using third party local proxy service providers that are external to the client network boundary. The different branches may also access the cloud services using local internet service providers, or the different branches may access the cloud services using different combinations of these and other network configurations.

The discussion above is merely provided for general background information and is not intended to be used as an aid in determining the scope of the claimed subject matter.

SUMMARY

A latency processing system detects traffic at a cloud service end point and analyzes packets in the detected traffic to identify a network configuration of a client that is accessing the cloud service. Latency components corresponding to different parts of the network configuration are identified and quantified. A recommendation engine is controlled to generate and surface an output indicative of recommendations for reducing network latency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, clients often use different types of network configurations in order to access cloud services. These different configurations can incorporate unnecessary latency into the system, but it may be very difficult for a client to identify latency components that are unnecessary and that could be avoided by taking some relatively simple actions. For instance, in one network configuration the client has multiple different branch locations, located in different cities, but uses a single proxy service provider at one of the branch locations inside the clients network boundary in order to access the cloud services. This can result in latency for branches that are located remotely from the proxy service provider. Such branch locations may be able to reduce latency if they use a local proxy service provider, or a local ISP for egress to the cloud services. However, it can be difficult for a client to know these latency reduction techniques.

Similarly, in a configuration where the client branch offices use local proxy service providers, there may be other proxy service providers in the same geographical location that perform with lower latency, but the client may not know that. Therefore, it can be difficult for the client to know whether to switch to a different proxy service provider and, if so, which proxy service provider to choose.

The same is true in configurations where the different branch locations use local ISPs to access the cloud services. It may be that other ISPs in the same geographic areas have lower latency, but the client does not know that, and does not know which ISP may have the lowest latency in the same geographic area.

The present description thus proceeds with respect to a system that detects traffic at a cloud service end point and identifies the client network configuration. The system identifies whether the client is using a proxy service provider, a local ISP, etc. The present system also detects a latency corresponding to the different components in the client network structure and determines whether those latency components are excessive, meaning that there are other alternatives with lower latency available to the client. If a latency reduction can be achieved, the present system generates a recommendation that both quantifies the latency reduction and identifies steps that can be taken in order to achieve the latency reduction. The recommendation can be surfaced in an interactive way for the client.

Figure 1:
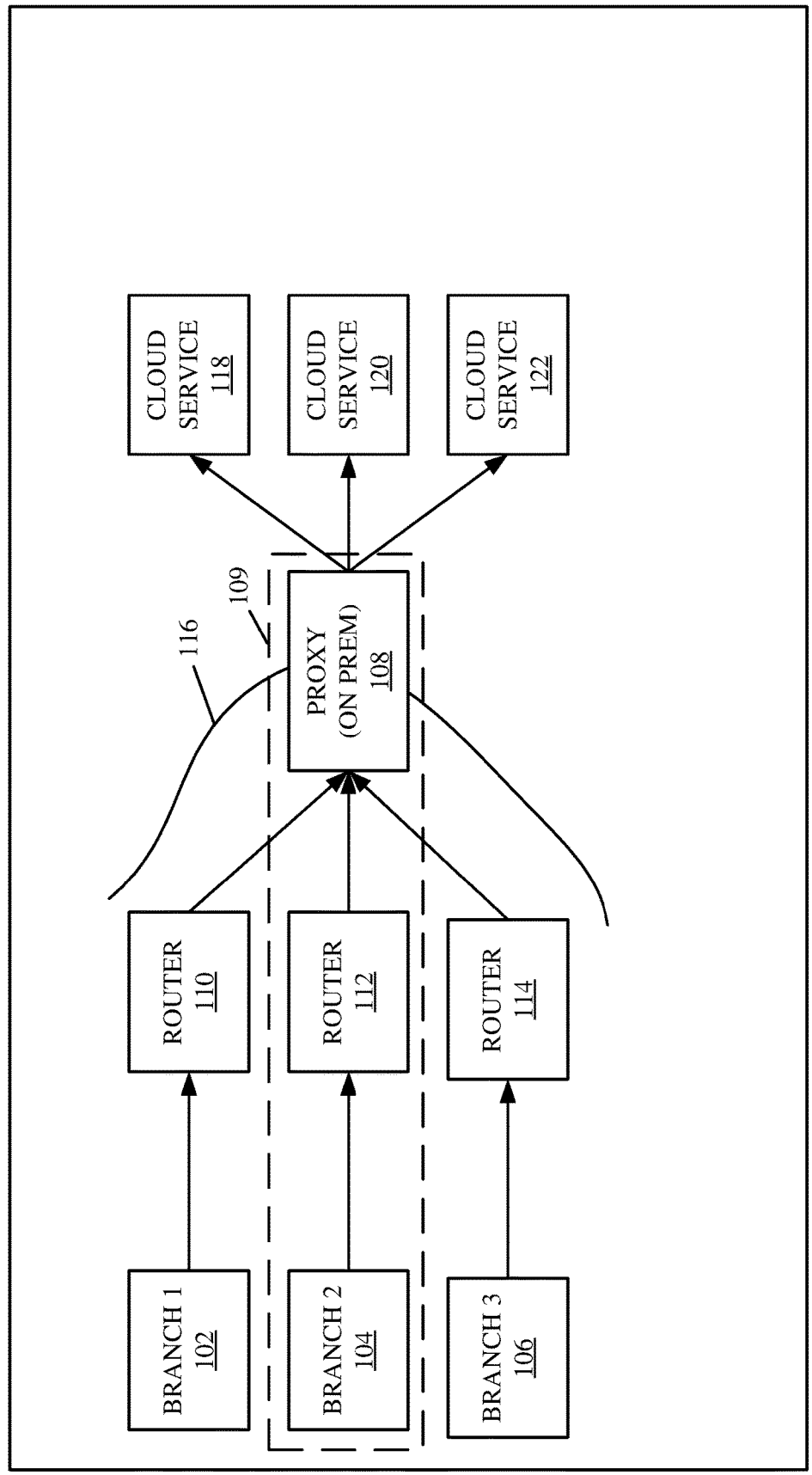
FIG. 1 is a block diagram of one example of a network architecture in which a proxy service provider is disposed within a client network.

FIG. 1 is a block diagram showing one example of a computing system architecture 100. Architecture 100 shows that a client may have a plurality of different branch locations 102, 104, and 106 that may be located in different geographic areas, such as different cities. The different branch locations have computing systems that are connected to a proxy service provider 108 by a network router. For instance, the computing system at branch 102 connects to proxy service provider 108 through network router 110. The computing system at branch 104 connects to proxy service provider 108 using network router 112, and the computing system at branch 106 connects to proxy service provider 108 using network router 114. In one example, the proxy service provider is located within the customer network boundary 116 and is located at the geographic location of one of the branches 102, 104 and 106. For purposes of the present discussion it will be assumed that proxy service provider 108 is located at the geographic location of branch 104. Each of the different branches 102, 104, and 106 use proxy service provider 108 to connect to one or more different cloud services 118, 120, and 122.

The cloud services are deployed at cloud service computing systems. Each cloud service may have a front end that exposes an interface that can be accessed by the branch computing systems 102-106 through proxy service provider 108. Each of the cloud services also has a backend that receives requests through the front end and can manipulate user data in response to the requests.

In the architecture 100 shown in FIG. 1, Proxy server 108 is located at the geographic location of branch computing system 104, as indicated by dashed line 109. The requests and responses are analyzed at the proxy service provider 108 which enforces policies and firewall constraints. The proxy service provider 108 establishes a new connection with cloud services 118-122 based upon the requests from the different branch computing systems 102-106. Architecture 100 introduces what is referred to as "backhaul latency" which is the latency incurred by the branch locations 102 and 106 sending requests to the geographic location of branch 104 because that is where the proxy service provider 108 is located. The backhaul latency may be excessive, especially where branch locations 102 and 106 are located at a great geographic distance from the location of branch 104.

Figure 2:
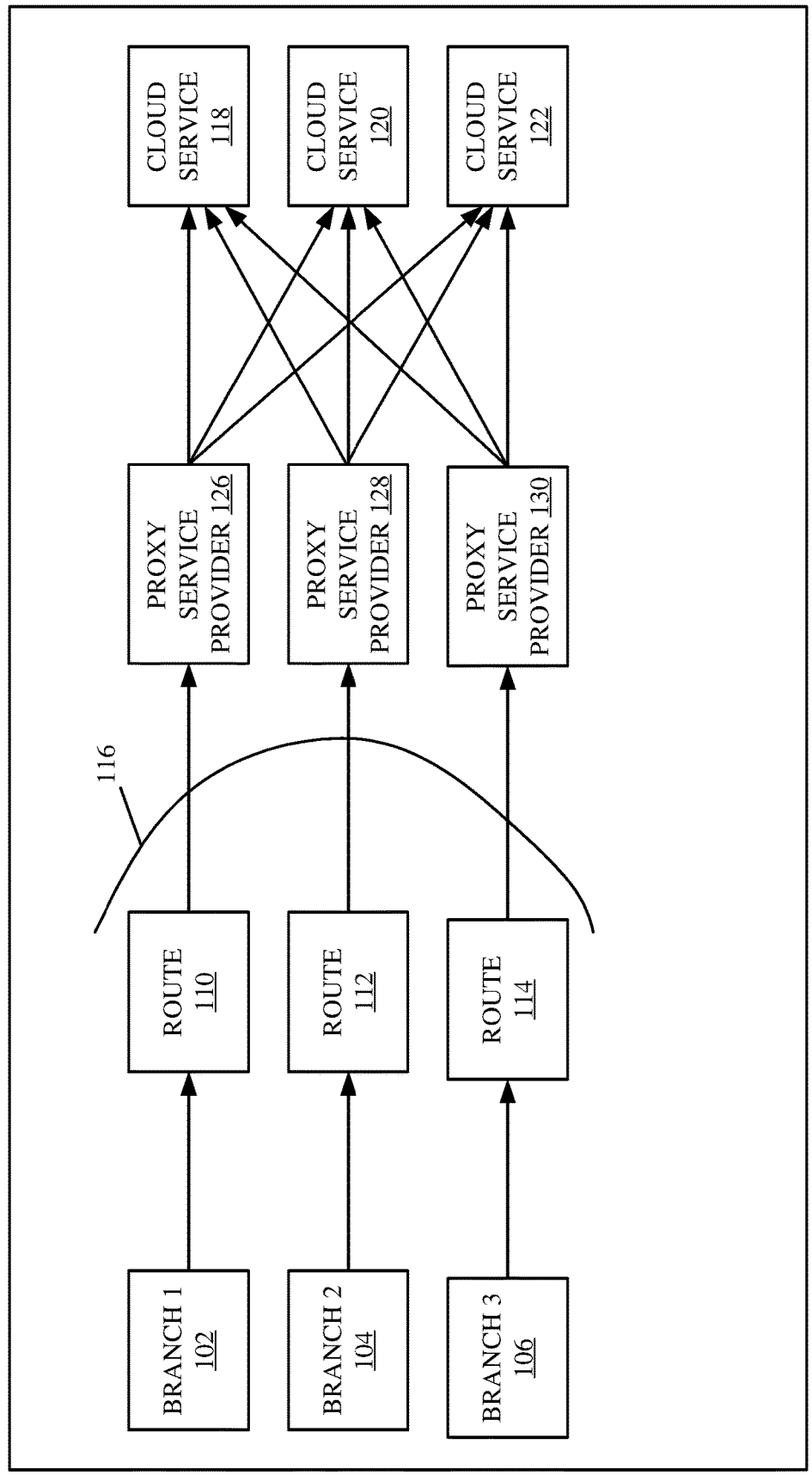
FIG. 2 is a block diagram showing another example of a network architecture in which clients use a proxy service provider that is outside of the client network boundary.

FIG. 2 is a block diagram showing one example of a second computing system architecture 124. Some items are similarly to those shown in FIG. 1, and they are similarly numbered. However, instead of using a proxy service provider 108 that is within the customer network boundary 116, the different branch computing systems 102, 104, and 106 in the architecture shown in FIG. 2 each use a proxy service provider that is deployed by a third party. For instance, branch computing system 102 uses proxy service provider 126. Branch computing system 104 uses proxy service provider 128, and branch computing system 106 uses proxy service provider 130.

In architecture 124, the security and company policies are enforced at the third party proxy service providers 126, 128, and 130. The proxy service providers terminate the requests received from the corresponding branch computing systems 102, 104, and 106 and create a new connection to the cloud service endpoints 118, 120, and 122. This enables the proxy service providers to enforce specific customer network policies on unencrypted packets, but it also introduces additional latency. In addition, the physical geographic location of each of the proxy service providers 126, 128, and 130 may impact the latency introduced in using those proxy service providers. Further, there may be other proxy service providers in similar geographic locations that have lower latency, but the users at branch computing systems 102, 104, and 106 may have no way of knowing that.

Figure 3:
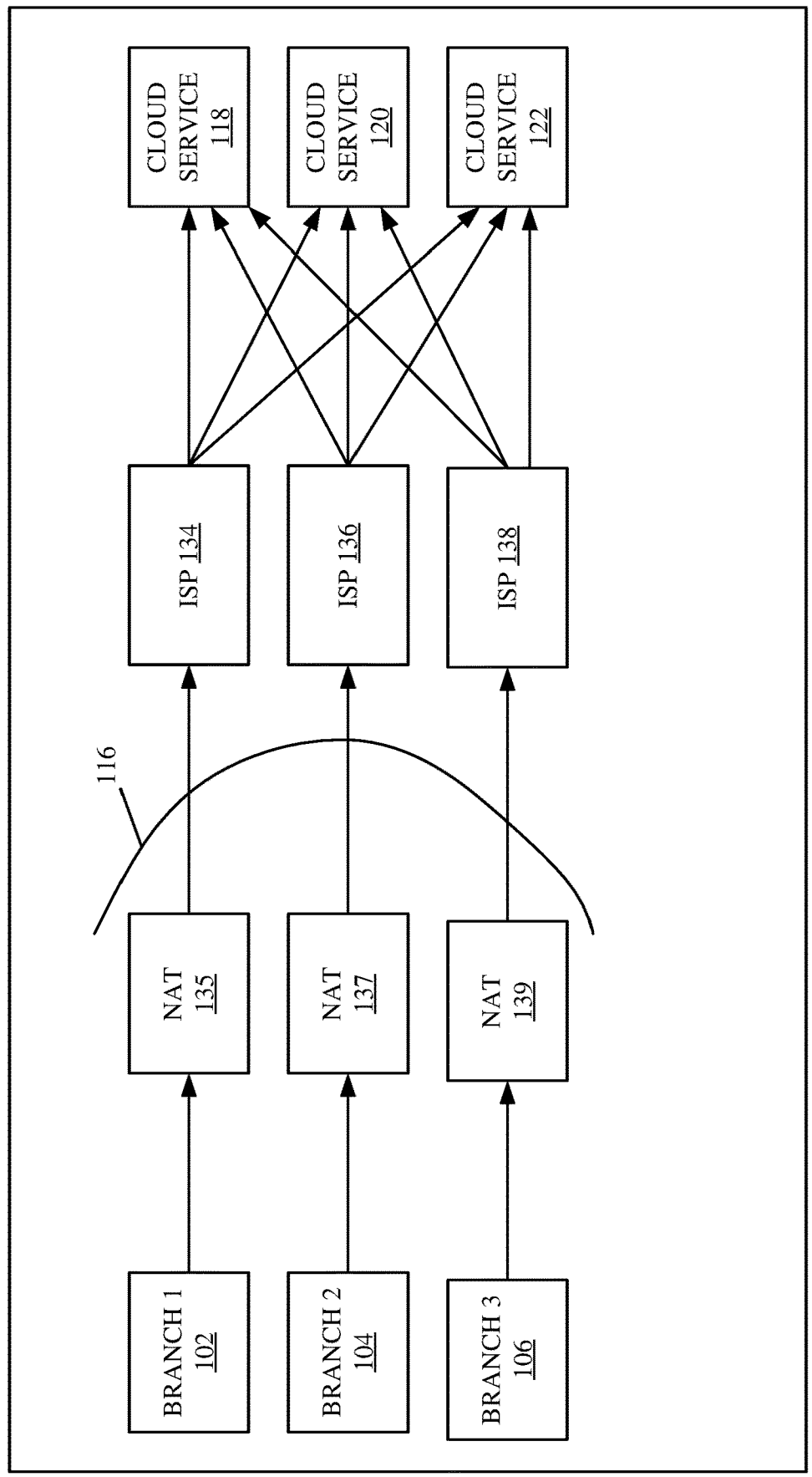
FIG. 3 is a block diagram showing another example of a network architecture in which client branch locations access cloud services using local internet service providers (ISPs).

FIG. 3 is a block diagram showing one example of a computing system architecture 132. Architecture 132 is similar to architecture 124 shown in FIG. 2, and similar items are similarly numbered. However, instead of using only third party proxy service providers 126, 128, and 130 (as shown in FIG. 2), the branch computing systems 102, 104, and 106 instead use local internet service provider (ISPs) to connect to the cloud services 118, 120, and 122. For instance, branch computing system 102 uses local ISP 134. Branch computing system 104 uses local ISP 136, and branch computing system 106 uses local ISP 138. In the architecture 132 illustrated in FIG. 3, each of the branch computing systems 102, 104, and 106 have a direct route to internet access of the various cloud services 118, 120, and 122, but the local ISPs 134, 136, and 138 do not perform policy enforcement. Therefore, in one example, the computing systems may use the architecture in FIG. 3 for trusted traffic and may use a proxy for non-trusted traffic. The network address translation components 135, 137, and 139 perform network analysis translation for connectivity, and the branch computing systems 102, 104 and 106 each expect that the local ISP 134, 136, and 138 has the least latency to the cloud services 118, 120, 122. However, there may be other ISPs in the same geographic area (e.g., in the same city or other predefined area) as the local ISPs 134, 136, and 138, that provide lower latency than the ISPs 134, 136, and 138. It would be very difficult, however, for the users of the branch computing systems 102, 104, and 106 to know that, much less to know the quantity of the reduction in latency that the user would experience by switching to a different ISP.

Figure 4:
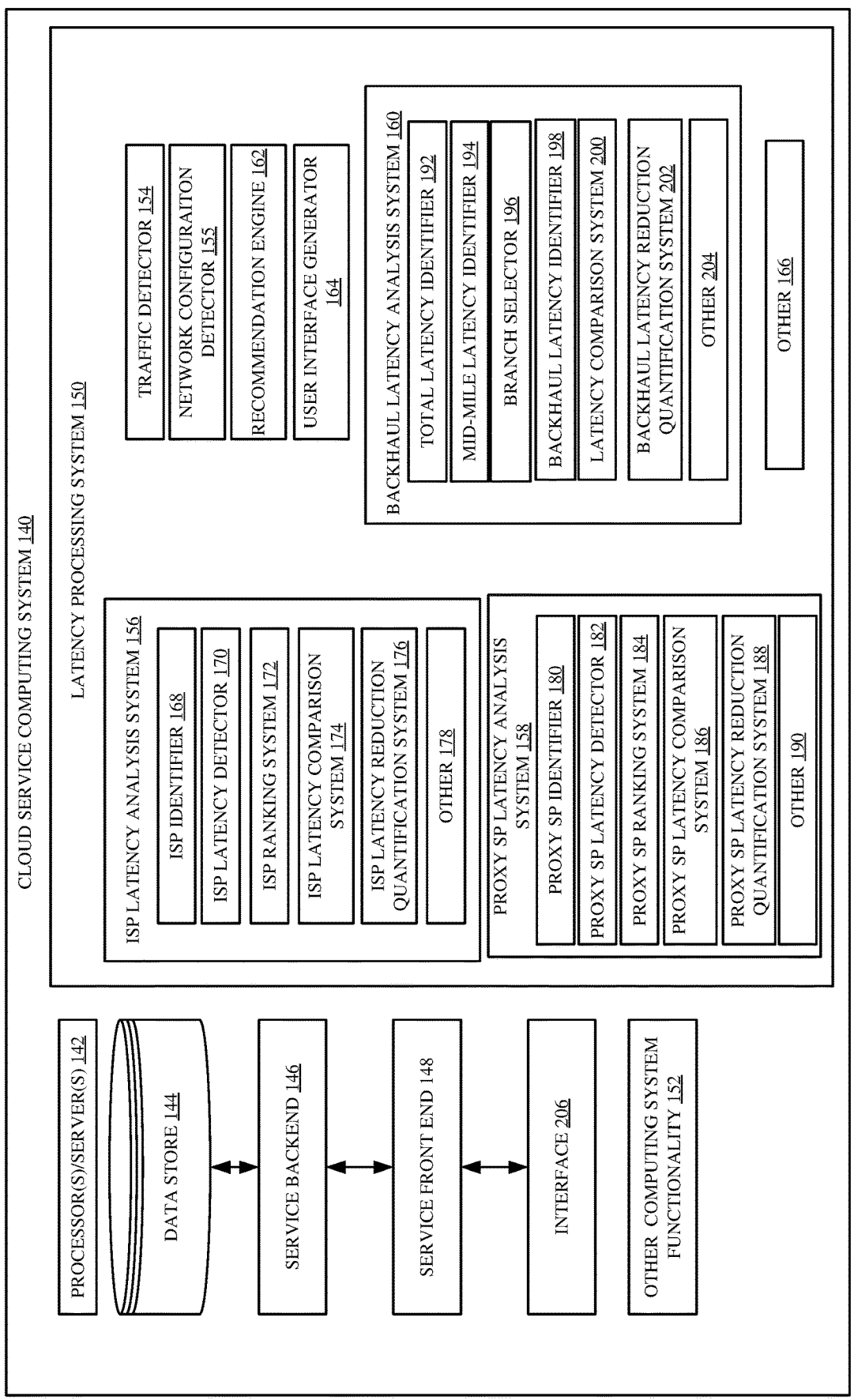
FIG. 4 is a block diagram showing one example of a cloud service computing system.

FIG. 4 is a block diagram of one example of a cloud service computing system 140. Cloud service computing system 140 can be used to deploy any of cloud services 118, 120, and 122 or different cloud services. In the example shown in FIG. 4, cloud service computing system 140 illustratively includes one or more processors or servers 142, data store 144, service backend 146, service front end 148, latency processing system 150, and any of a wide variety of other computing system functionality 152. Latency processing system 150 illustratively includes traffic detector 154, ISP latency analysis system 156, proxy SP latency analysis system 158, network configuration detector 155, backhaul latency analysis system 160, recommendation engine 162, user interface generator 164, and other items 166. ISP latency analysis system 156 includes ISP identifier 168, ISP latency detector 170, ISP ranking system 172, ISP latency comparison system 174, ISP latency reduction quantification system 176, and other items 178. Proxy SP latency analysis system 158 includes proxy SP identifier 180, proxy SP latency detector 182, proxy SP ranking system 184, proxy SP latency comparison system 186, proxy SP latency reduction quantification system 188, and other items 190. Backhaul latency analysis system 160 includes total latency identifier 192, mid-mile latency identifier 194, branch selector 196, backhaul latency identifier 198, latency comparison system 200, backhaul latency reduction quantification system 202, and other items 204. Before describing the overall operation of cloud service computing system 140 in more detail, a description of some of the items in cloud service computing system 140, and their operation, will first be provided.

Service front end 148 exposes an interface 206 to a service that is hosted by cloud service computing system 140. Interface 206 can be accessed by the different branch computing systems 102, 104, and 106 so systems 102, 104, and 106 can provide requests to the cloud service endpoint. Service front end 148 receives the requests through interface 206 and provides them to service backend 146 which performs manipulations on customer data stored in data store 144, based upon the requests. Service backend 146 can also return information to service front end 148 in response to the requests. Service front end 148 can respond to the requesting branch computing system 102, 104, and/or 106 through interface 206.

Latency processing system 150 detects traffic (requests) received at the hosted service and identifies the network configuration of the clients that submitted the requests. For instance, traffic detector 154 can detect packets in the received request and network configuration detector 155 can detect the type of configuration (such as those shown in FIGS. 1-3) that the requests originated from. If the clients submit the request through an ISP (such as in the configuration 132 shown in FIG. 3), then ISP latency analysis system 156 analyzes the latency corresponding to the ISPs to determine whether any latency reductions can be achieved. ISP identifier 168 performs a reverse IP address lookup to identify the ISP from which each request came and identifies a plurality of different ISPs that are being used in the same geographic area (such as in the same city). ISP latency detector 170 detects the latency incurred by using each of the identified ISPs. ISP ranking system 172 ranks available ISPs based upon the detected latency. ISP latency comparison system 174 selects a client for analysis and compares the latency of the ISP that the client is currently using with a minimum latency that could be observed by the client, if the client were to switch to another ISP in the ranked list. ISP latency reduction quantification system 176 quantifies the reduction in latency that could be achieved by switching ISPs and provides an output to recommendation engine 162. The output identifies the particular ISP that the client should switch to, and the quantity of reduction in latency that would be likely experienced by the client, if the client switched to that ISP. Recommendation engine 162 generates a recommendation based upon that information and provides the recommendation to user interface generator 164 which generates a user interface for surfacing the recommendation to the user at the client computing system that sent the request. The user interface can be an interactive user interface so that the user can interact with it in order to quickly and automatically switch ISPs, dismiss the recommendation, save the recommendation for later action, etc.

When network configuration detector 155 determines that the client is in a network configuration such as configuration 124 shown in FIG. 2, proxy SP analysis system 158 identifies any avoidable latencies corresponding to the proxy service provider that the client is using. Proxy SP identifier 180 performs a reverse IP lookup using the network address translation structure and maps it to a particular proxy service provider. Proxy service provider latency detector 182 detects the latency of the identified proxy service provider and also latencies corresponding to other proxy service providers that are in the same geographic area (e.g., in the same city) as the proxy service provider that is being used by the client. Proxy service provider ranking system 184 ranks the available proxy service providers based on latency. Proxy service provider latency comparison system 186 compares the latency experienced by the client using the identified proxy service provider against the latency that would be experienced by the client if the client used the highest ranking proxy service provider (the proxy service provider with the lowest latency). If there is latency reduction available by choosing another proxy service provider, then latency reduction quantification system 188 quantifies that latency reduction and provides an output to recommendation engine 162 indicating the proxy service provider that the client should switch to and the quantity of latency reduction that would be experienced if the client switched. Recommendation engine 162 generates a recommendation quantifying the possible latency reduction and identifying the action to take to achieve the possible latency reduction (e.g., to switch to a particular proxy service provider). The recommendation is provided for user interface generator 164 which surfaces the recommendation for the user.

When network configuration detector 155 determines that a client is in a configuration such as that shown in FIG. 1, then system 160 analyzes the backhaul latency (e.g., the latency for branches to send requests to the proxy service provider) to determine whether any latency reductions are available.

Total latency identifier 192 identifies the total latency corresponding to the request. The total latency can be identified by accessing the time stamps on the packets that are sent as part of the request to determine when they are sent, and when they arrived at the cloud service endpoint. Mid-mile latency identifier 194 identifies the mid-mile latency as the latency from the on-premise proxy service provider 108 to the cloud service end point. Branch selector 196 then selects one of the branch computing systems 102, 104, and 106 and backhaul latency identifier 198 identifies the backhaul latency corresponding to the selected branch. For instance, assume that the branch selector 196 selects branch computing system 102. The total latency for the request from branch 102 is identified and the mid-mile latency from proxy service provider 108 to the cloud service endpoint is subtracted from the total latency to arrive at the backhaul latency. The backhaul latency is thus the latency encountered by branch computing system 102 in sending a request to proxy service provider 108 at the location of branch 104. The backhaul latency may be high, such as in cases where branch computing system 102 is located a great distance from proxy service provider 108.

Latency comparison system 200 identifies the latency that would be experienced if the branch computing system 102 used a third party, local, proxy service provider (such as proxy service provider 126 shown in FIG. 2) and the latency that would be experienced if branch computing system 102 used a local ISP (such as ISP 134 shown in FIG. 3). Latency comparison system 200 then compares the latency experienced by branch computing system 102 in going through proxy service provider 108 against the latencies that would be experienced in one of the other architectures. If a latency reduction can be realized by switching to one of the other architectures, then backhaul latency reduction quantification system 202 quantifies that latency reduction and generates an output indicating the quantity of the latency reduction that could be realized and the particular architecture that the branch computing system 102 should switch to in order to realize that reduction. Based on the output from system 202, recommendation engine 162 generates a recommendation and provides the recommendation to user interface generator 164 which surfaces the recommendation for user interaction at branch computing system 102.

Figure 5:
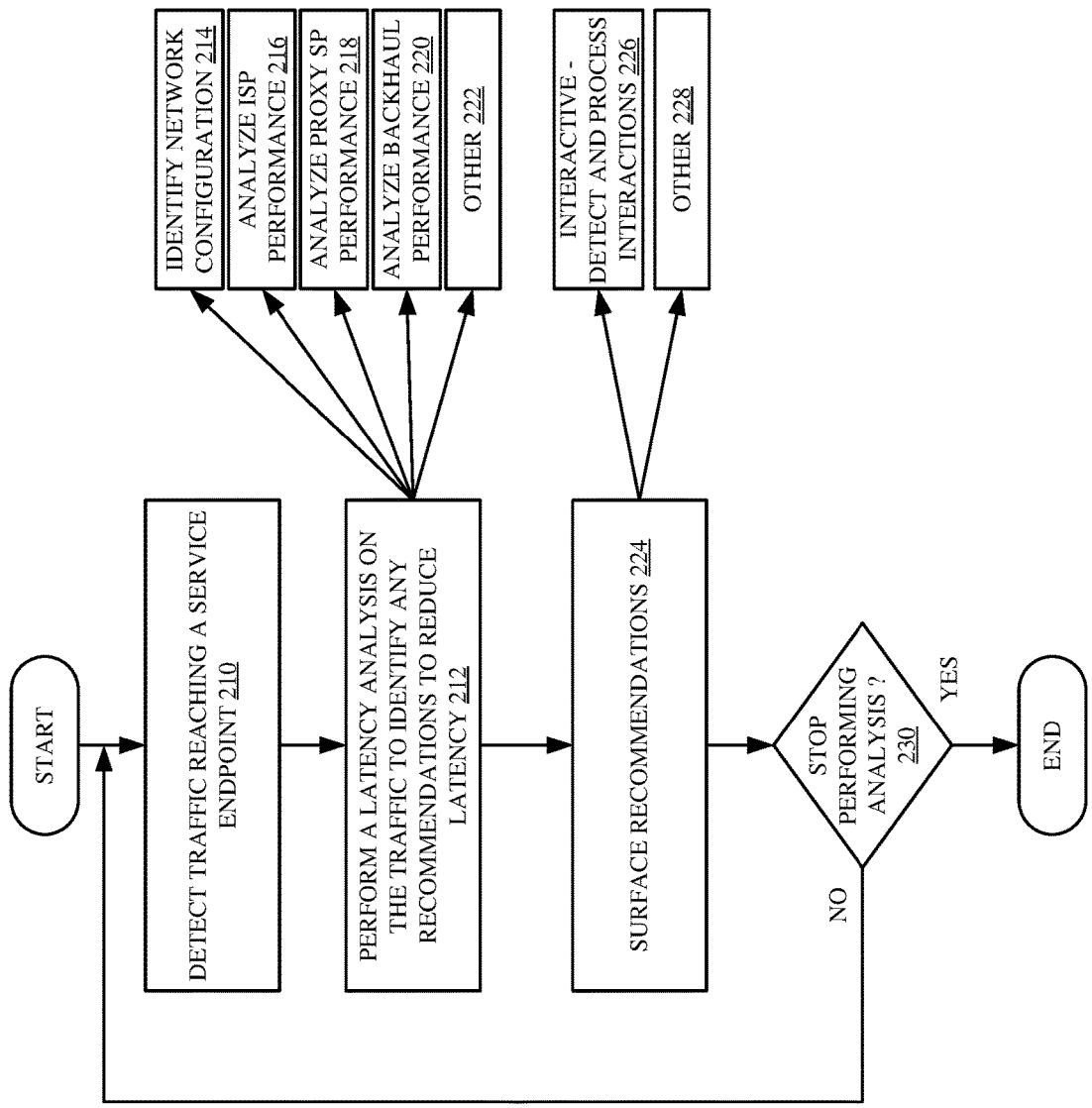
FIG. 5 is a flow diagram illustrating one example of the operation of the cloud service computing system in identifying a client network configuration and detecting and quantifying latency components.

FIG. 5 is a flow diagram illustrating one example of the operation of cloud computing system 140 in detecting latency, identifying possible latency reduction and surfacing a recommendation for user interaction. Traffic detector 154 first detects traffic reaching a cloud service endpoint, as indicated by block 210 in the flow diagram of FIG. 5. Latency processing system 150 then performs a latency analysis on the traffic to identify any recommendations that can be made in order to reduce latency experienced at the client computing systems. Performing the latency analysis is indicated by block 212 in the flow diagram of FIG. 5.

By way of example, network configuration detector 155 can identify the network configuration as indicated by block 214. ISP latency analysis system 156 can analyze the IPS performance to identify any possible reductions in latency, as indicated by block 216. Proxy SP latency analysis system can analyze the proxy SP performance to identify any possible reductions in latency, as indicated by block 218, and backhaul latency analysis system 160 can analyze backhaul performance to identify any possible reductions in latency, as indicated by block 220. Latency processing system 150 can identify latency reductions in other ways as well, as indicated by block 222.

Recommendation engine 162 can then generate recommendations and the recommendations can be surfaced by user interface generator 164, as indicated by block 224 in the flow diagram of FIG. 5. The recommendations can be surfaced as part of an interactive user interface display and user interactions with the recommendation can be detected and processed as well, as indicated by block 226. The recommendations can be generated and surfaced in other ways as well, as indicated by block 228.

In one example, this type of latency monitoring is continuous, periodic, or otherwise intermittent. Unless it is time to stop performing the latency analysis, as indicated by block 230, processing reverts back to block 210 where more traffic is detected at the cloud service end point.

Figure 6:
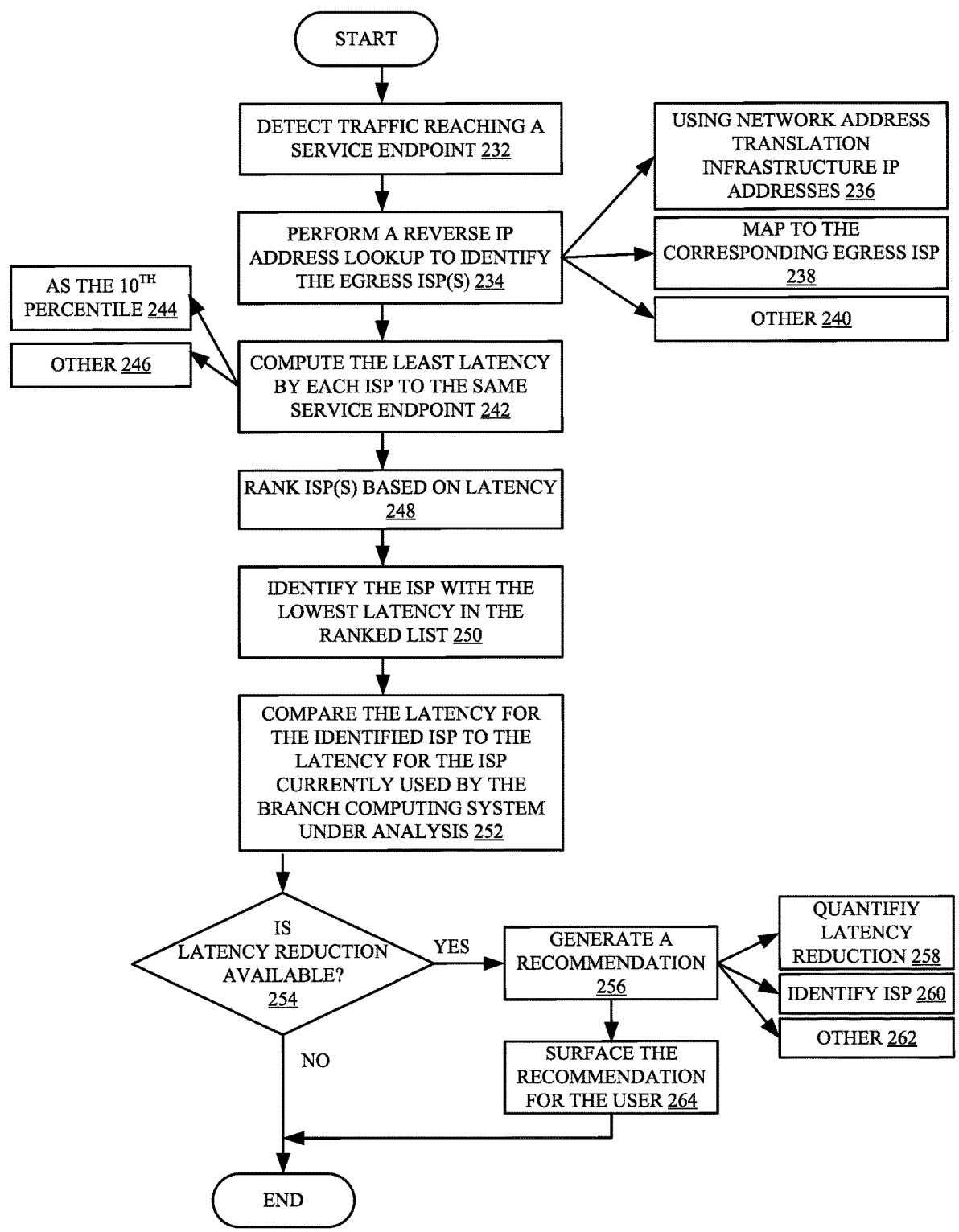
FIG. 6 is a flow diagram illustrating one example of an internet service provider latency analysis system.

FIG. 6 is a flow diagram illustrating one example of the operation of ISP latency analysis system 156 in more detail. It is first assumed that traffic detector 154 detects traffic reaching a service endpoint, as indicated by block 232 in the flow diagram of FIG. 6. It is also assumed that network configuration detector 155 has detected that the branch computing system under analysis (e.g., branch computing system 102) is using a local ISP, such as in the configuration 132 shown in FIG. 3. ISP identifier 168 then performs a reverse IP address lookup to identify the egress ISP 134 that branch computing system 102 is using, as indicated by block 234 in the flow diagram of FIG. 6. ISP identifier 168 also identifies other ISPs in the same geographic area based on other traffic received at the cloud service endpoint. The reverse look up can be performed using the network address translation infrastructure and the IP address in the headers of the packets, as indicated by block 236. The reverse look up can be used to map to the corresponding egress ISP 134 that the branch computing system 102 is using and that other computing systems in the same area are using, as indicated by block 238. The ISPs can be identified in other ways as well, as indicated by block 240.

ISP latency detector 170 then detects the least latency by each ISP that could be used by the branch computing system 102. The least latency is computed for each of the available ISPs to the same service endpoint as indicated by block 242. The least latency may illustratively be the tenth percentile latency from all network requests originating from the same geographic location (e.g., from the same city) by each ISP, as indicated by block 244. The least latency across the available ISPs can be computed in other ways as well, as indicated by block 246. Then, for each of the ISPs in the same geographic area (e.g., the same city) and for which the least latency was computed, the ISPs are ranked by the least latency encountered at each ISP. Ranking the ISPs based on latency is indicated by block 248 in the flow diagram of FIG. 6.

ISP latency comparison system 174 then identifies the ISP with the lowest latency in the ranked list of ISPs and compares the latency for the identified ISP to the latency for the particular ISP that the branch computing system under analysis (branch computing system 102) is currently using. Identifying the ISP with the lowest latency in the ranked list is indicated by block 250, and comparing that latency with the latency for the ISP that the branch computing system under analysis is currently using is indicated by block 252.

If the branch computing system could experience lower latency by switching to the identified ISP (the ISP with lowest latency in the ranked list), then ISP latency reduction quantification system 176 quantifies that possible latency reduction and provides an output to recommendation engine 162 which generates a recommendation for the branch computing system 102. Determining whether any latency reduction is available is indicated by block 254, and generating a recommendation is indicated by block 256. In one example, the recommendation quantifies the latency reduction that is available by switching ISPs, as indicated by block 258. In one example, the recommendation also identifies the particular ISP that the branch computing system 102 should use in order to achieve the latency reduction. Identifying the ISP is indicated by block 260. The recommendation can be interactive and include a wide variety of other information as well, as indicated by block 262. User interface generator 164 then surfaces the recommendation for the user as indicated by block 264.

Figure 7:
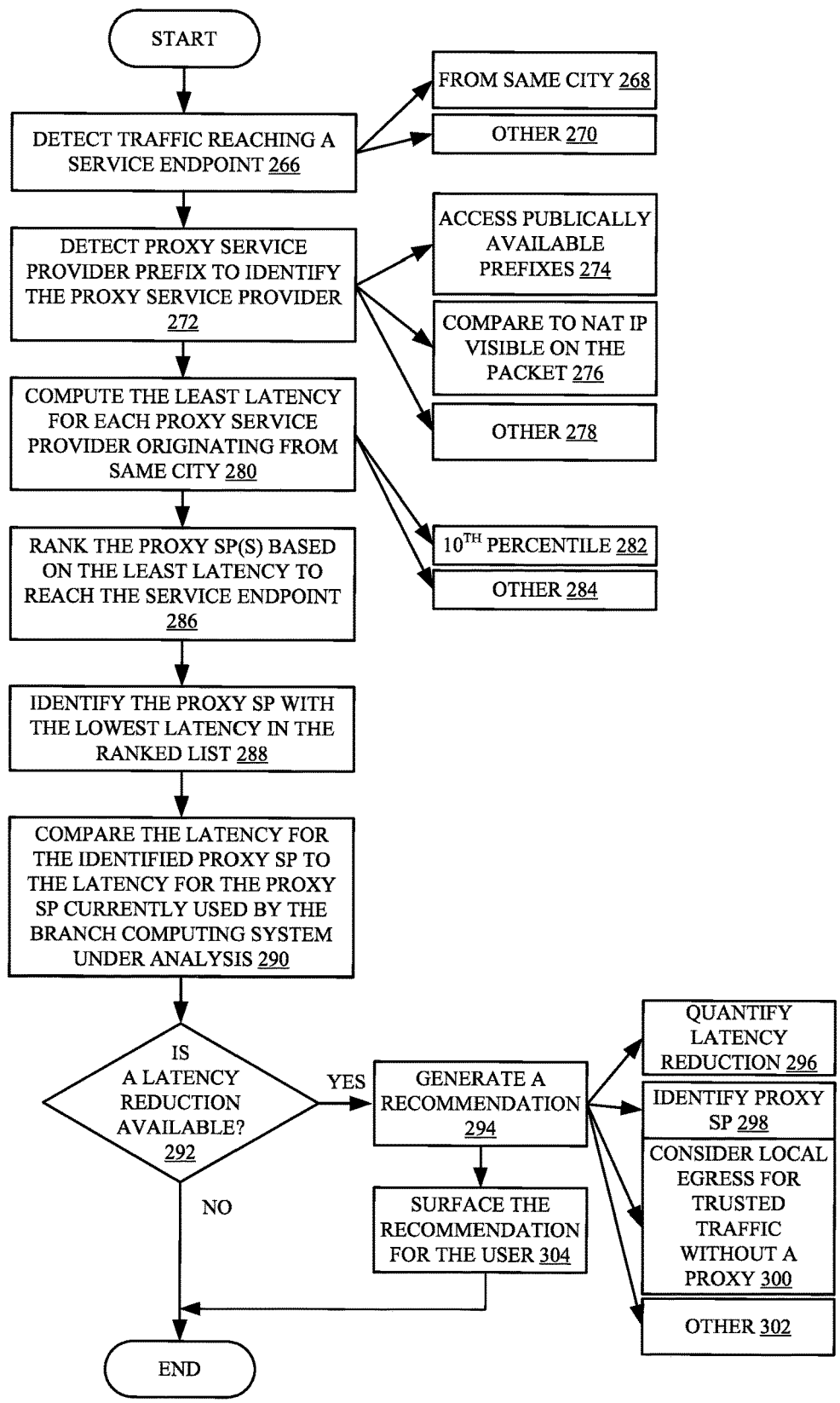
FIG. 7 is a flow diagram illustrating one example of the operation of a proxy service provider latency analysis system.

FIG. 7 is a flow diagram illustrating one example of the operation of proxy SP latency analysis system 158 in analyzing latency when the branch computing system under consideration is in a configuration such as that shown in FIG. 2 where the branch computing system 102 is using a third party proxy service provider to access the cloud service endpoint. It is first assumed that traffic detector 154 detects traffic reaching the cloud service endpoint where the traffic includes requests from client computing systems in the same city. Detecting the traffic is indicated by block 266, and identifying traffic that is from the same city is indicated by block 268. It will be noted that the traffic can be detected as coming from the same geographic area in other ways, and the area can be an area other than the same city as well such as an area within a geographic diameter, or in another area of predefined size. Detecting the traffic in other ways is indicated by block 270 in the flow diagram of FIG. 7.

In the traffic (request packets) that are detected at the cloud service endpoint, proxy SP identifier 180 detects proxy service provider prefixes to identify the proxy service providers that are providing the requests. Detecting the proxy service provider prefix is indicated by block 272 in the flow diagram of FIG. 7. Proxy SP identifier 180 can then access publicly available prefixes and compare those prefixes to the network address translation IP address available on the packets to identify the particular service providers that are sending the requests. Accessing the publicly available prefixes is indicated by block 274 and comparing them to the IP address in the network address translation infrastructure is indicated by block 276. The proxy service providers can be identified in other ways as well, as indicated by block 278.

Proxy SP latency 182 detector then computes the least latency for each proxy service provider originating from the same city, as indicated by block 280. Again, the least latency may be the tenth percentile latency as indicated by block 282, or another latency, as indicated by block 284.

Proxy SP ranking system 184 then ranks the proxy service providers for which latency was computed, based upon the least latency through those proxy service providers to reach the cloud service endpoint. Ranking the proxy service provider is based on least latency is indicated by block 286 in the flow diagram of FIG. 7.

Proxy SP latency comparison system 186 then identifies the proxy service provider with the lowest latency in the ranked list and compares the latency for that identified proxy service provider to the latency for the proxy service provider currently being used by the branch computing system under analysis (e.g., branch computing system 102). Identifying the proxy service provider with the lowest latency in the ranked list is indicated by block 288 and comparing the latency for that proxy service provider against the latency experienced by the branch computing system under analysis 102 is indicated by block 290 in the flow diagram of FIG. 7.

Assume, for instance, that a first proxy service provider has a latency of 28 milliseconds to reach the cloud service end point from city A. Assume a second proxy service provider has a 52 millisecond latency from city A, and assume a third proxy service provider (the one which the branch computing system 102 is currently using) has a latency of 129 milliseconds to reach the cloud service endpoint from city A. In that case, the top ranked proxy service provider in the list is the first proxy service provider with a latency of 28 milliseconds, and the latency reduction available to the client at the branch computing system 102 is 101 milliseconds (129 milliseconds-28 milliseconds). Therefore, proxy SP latency comparison system 186 identifies that there is a latency reduction available, at block 292, and generates an output to recommendation engine 162 identifying the quantity of the latency reduction as well as the particular proxy service provider that the client should switch to in order to realize that latency reduction.

Recommendation engine 162 generates a recommendation, as indicated by block 294. The recommendation can quantify the latency reduction as indicated by block 296 and identify the proxy service provider that should be selected in order to realize the latency reduction, as indicated by block 298.

In another example, the latency reduction quantification system 188 also considers a latency reduction that may be available if the branch computing system 102 uses a local egress ISP instead of a proxy service provider. In that case, a separate latency reduction and a separate portion of the recommendation can be provided to identify the latency reduction that may be realized by using an egress ISP instead of a proxy service provider, and the recommendation may also identify the particular ISP that should be selected to realize that latency reduction. Having the recommendation consider an egress for trusted traffic without a proxy service provider is indicated by block 300 in the flow diagram of FIG. 7. The recommendation can include other information 302 as well.

The recommendation can be output from recommendation engine 162 to user interface generator 164 which surfaces the recommendation for the user of the branch computing system under analysis (branch computing system 102). Surfacing the recommendation is indicated by block 304 in the flow diagram of FIG. 7.

Figure 8:
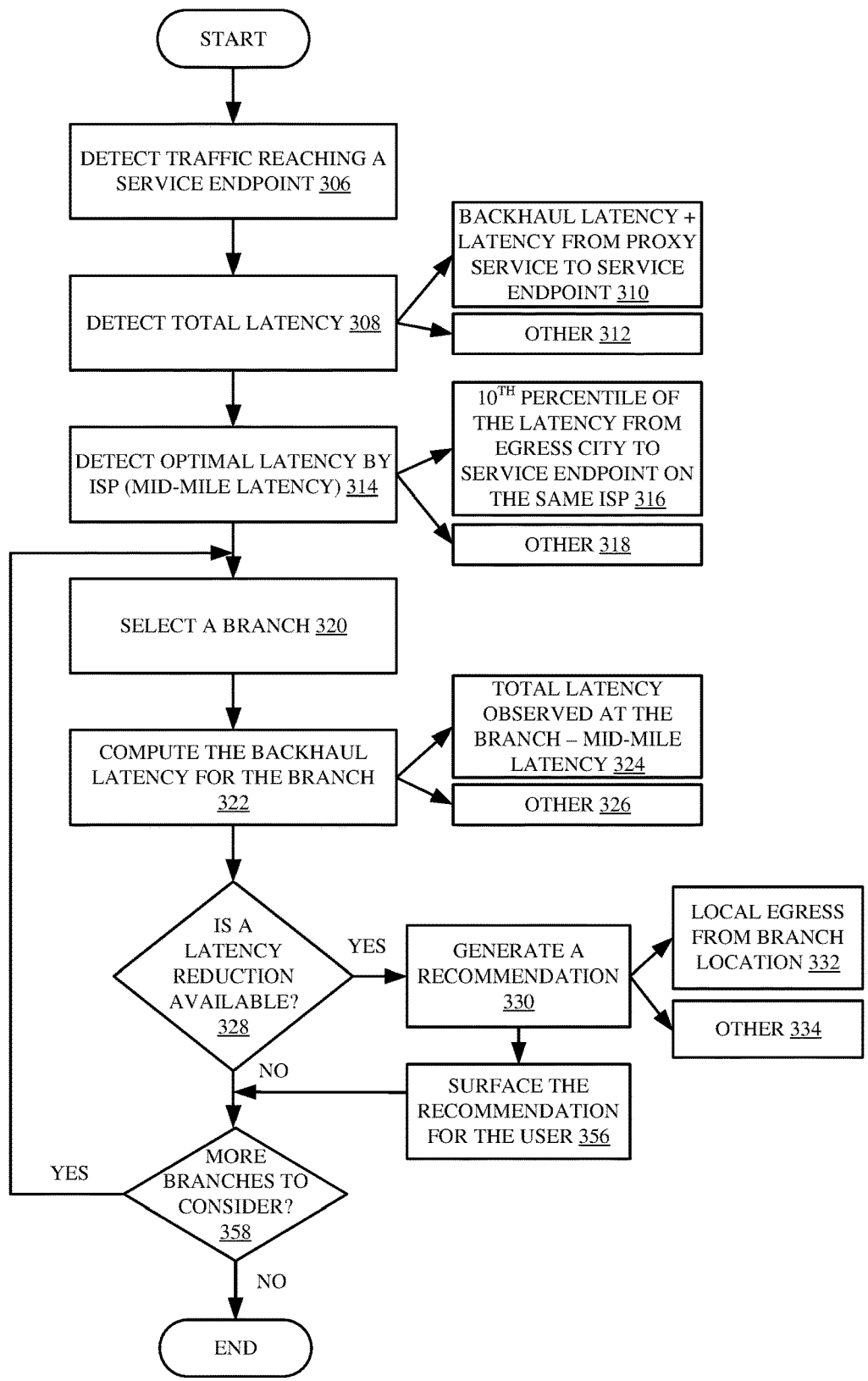
FIG. 8 is a flow diagram illustrating one example of the operation of a backhaul latency analysis system.

FIG. 8 is a flow diagram illustrating one example of the operation of backhaul latency analysis system 160 in more detail. It is first assumed that traffic detector 154 detects traffic reaching a service endpoint from a plurality of different proxy service providers located in the same city, and from a plurality of different branches all using the same proxy service provider. Detecting traffic reaching the cloud service endpoint is indicated by block 306 in the flow diagram of FIG. 8.

Total latency identifier 192 then identifies the total latency for a request, as indicated by block 308. The total latency is illustratively the backhaul latency plus the latency from the proxy service provider to the cloud service endpoint, as indicated by block 310. The total latency can be detected in other ways as well, as indicated by block 312.

Mid-mile latency identifier 194 then detects the optimal mid-mile latency, for a plurality of different ISPs, for the same city, as indicated by block 314. The optimal mid-mile latency may be the tenth percent latency from an egress city to a service endpoint on the same ISP, as indicated by block 316. The optimal mid- mile latency can be detected in other ways as well, as indicated by block 318.

Branch selector 196 then selects a branch for which to compute the backhaul latency. Selecting a branch is indicated by block 320 in the flow diagram of FIG. 8. Assume, for instance, that branch selector 196 has selected the branch computing system 102 for calculation of backhaul latency. Backhaul latency identifier 198 then computes the backhaul latency for the selected branch, as indicated by block 322. The backhaul latency can be computed by taking the total latency observed at the branch (or a request submitted by the branch) minus the mid-mile latency for that branch (the latency from the proxy service provider to the cloud service endpoint), as indicated by block 324. The backhaul latency can be computed in other ways as well, as indicated by block 326.

Latency comparison system 200 then determines whether there is a latency reduction available. The latency reduction may be determined based upon whether the branch computing system 102 could experience a latency reduction by using a local ISP, or a third party proxy service provider instead of using the on-prem service provider 108. For instance, when branch computing system 102 is located a great deal of distance from the physical location of proxy service provider 108, then it may be better for the branch computing system 102 to instead use a local ISP or a local third party proxy service provider to access the cloud service end point. Latency comparison system 200 determines whether there can be a latency reduction achieved by using one of these methods instead of using the on-prem proxy service provider 108. Determining whether there is a latency reduction available is indicated by block 328.

If so, latency comparison system 200 generates an output to recommendation engine 162 quantifying the possible latency reduction and identifying the local third party proxy service provider or the local ISP that might be selected in order to achieve the latency reduction. Recommendation engine 162 generates a recommendation including this information, as indicated by block 330. The recommendation can identify the local egress from the branch location, as indicated by block 332. The recommendation can include other information 334 as well. User interface generator 164 then generates an output to surface the recommendation for the user, as indicated by block 356.

If there are more branches to consider, as indicated by block 358, then processing reverts back to block 320 where the next branch computing system is selected for the computation of backhaul latency, and for the possible recommendation to switch to a different configuration in order to reduce overall latency.

It can thus be seen that the present system detects traffic reaching a cloud service endpoint point, identifies the configuration of the requesting computing system and the particular ISP or proxy service provider being used. The system then determines whether there may be a latency reduction available by switching configurations, switching ISPs, or switching proxy service providers and, if so, generates a recommendation that quantifies the latency reduction that may be available and that identifies the particular steps to take in order to obtain that latency reduction. The recommendation can be interactive enabling the user to easily switch ISPs, switch proxy service providers, change configuration, etc.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Cloud computing architectures have been discussed herein. In one example, cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of cloud architectures as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 9:
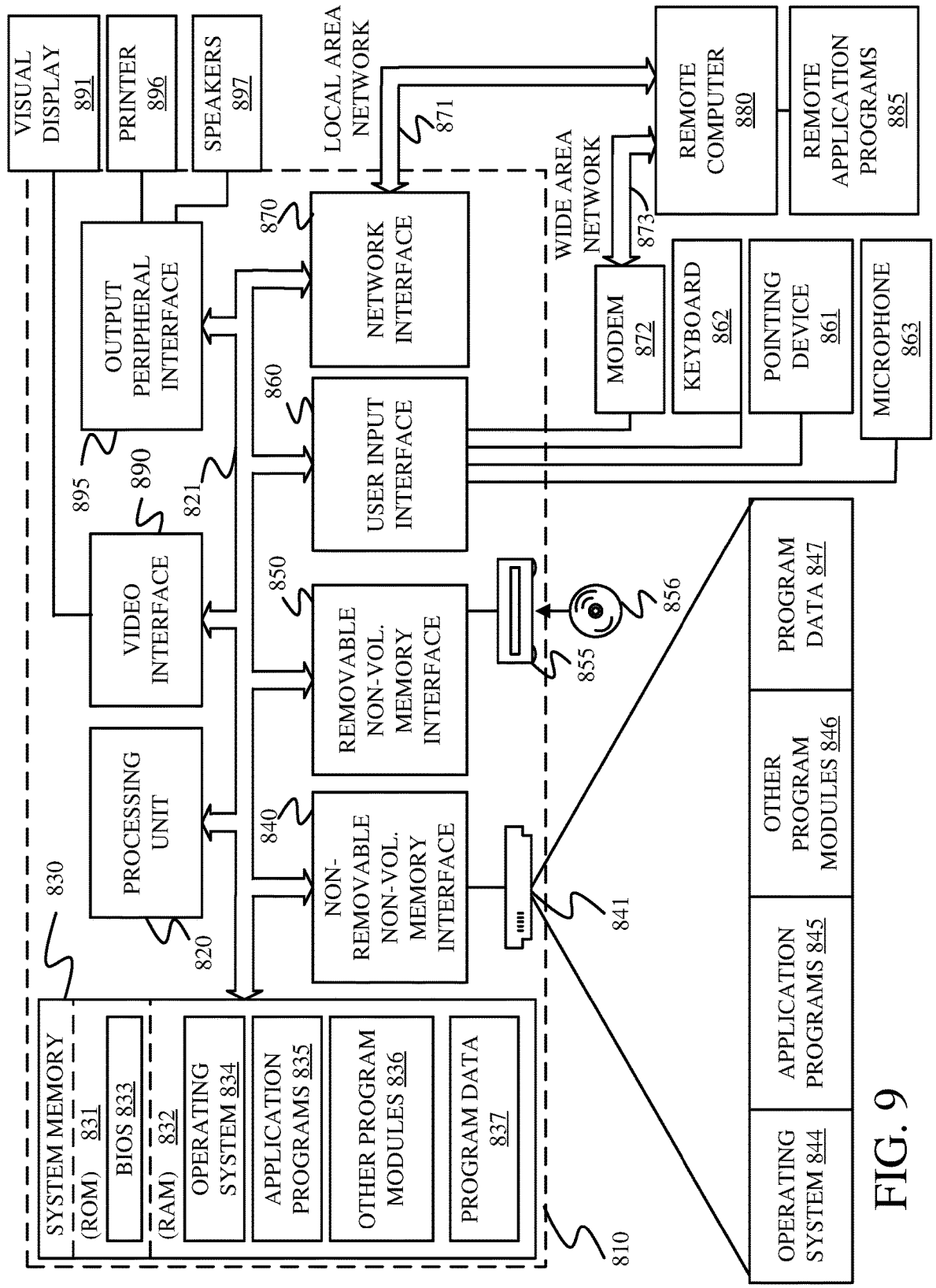
FIG. 9 is a block diagram showing one example of a computing environment.

FIG. 9 is one example of a computing environment that can be used in the architectures shown in previous FIGS. With reference to FIG. 9, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system, comprising:
  at least one processor; and
  a data store storing instructions which, when executed by the at least one processor, cause the at least one processor to perform steps comprising:
    detecting a first latency for a first client, using a first set of network components, in connecting to a cloud service endpoint;
    detecting a second latency for a second client, using a second set of network components, in a common geographic area as the first client, in connecting to the cloud service endpoint, the second latency being higher than the first latency;
    identifying a change in the second set of network components that can be made by the second client to obtain a latency reduction, based on the latency encountered the using first set of network components; and
    generating a latency reduction recommendation output to the second client, the latency reduction recommendation output identifying a quantity of latency reduction available to the second client and the identified change in the second set of network components.

Example 2 is the computer system of any or all previous examples wherein identifying a change in the second set of network components comprises:
  identifying a change from a first, higher latency, internet service provider (ISP) in the common geographic area to a second, lower latency, ISP in the common geographic area.

Example 3 is the computer system of any or all previous examples wherein identifying a change from a first, higher latency, ISP to a second, lower latency, ISP, comprises:

identifying a plurality of ISPs in the common geographic area that are being used to connect to the cloud service endpoint based on the detected traffic;

detecting a latency corresponding to each of the plurality of ISPs;

determining which of the plurality if ISPs the first and second clients are using based on requests received from the first and second clients at the cloud service endpoint; and identifying the ISP used by the second client as the higher latency ISP and identifying the ISP used by the first client as the lower latency ISP.

Example 4 is the computer system of any or all previous examples wherein identifying a change in the second set of network components comprises:

identifying a change from a first, higher latency, proxy service provider in the common geographic area to a second, lower latency, proxy service provider in the common geographic area.

Example 5 is the computer system of any or all previous examples wherein identifying a change from a first, higher latency, proxy service provider to a second, lower latency, proxy service provider, comprises:

identifying a plurality of proxy service providers in the common geographic area that are being used to connect to the cloud service endpoint based on the detected traffic;

detecting a latency corresponding to each of the plurality of proxy service providers;

determining which of the plurality if proxy service providers the first and second clients are using based on requests received from the first and second clients at the cloud service endpoint; and identifying the proxy service provider used by the second client as the higher latency proxy service provider and identifying the proxy service provider used by the first client as the lower latency proxy service provider.

Example 6 is the computer system of any or all previous examples wherein the first client has a plurality of branch computing systems and wherein detecting a first latency comprises:

detecting a latency encountered by each of the branch computing systems in connecting to the cloud service endpoint.

Example 7 is the computer system of any or all previous examples wherein the branch computing systems connect to the cloud service endpoint through a proxy service provider and wherein detecting a latency encountered by each of the branch computing system comprises:

detecting a backhaul latency for each of the branch computing systems, the backhaul latency comprising a latency of connecting from the branch computing system to the proxy service provider.

Example 8 is the computer system of any or all previous examples and further comprising:

identifying, for each branch computing system, whether a lower latency connection configuration is available; and if so, identifying the lower latency connection configuration for the branch computing system and a quantity of latency reduction corresponding to the lower latency connection configuration.

Example 9 is the computer system of any or all previous examples wherein generating the latency reduction recommendation output comprises:

generating a recommendation output indicative of the quantity of latency reduction and identifying the lower latency connection configuration.

Example 10 is a computer implemented method, comprising:

detecting a first latency for a first client, using a first set of network components, in connecting to a cloud service endpoint;

detecting a second latency for a second client, using a second set of network components, in a common geographic area as the first client, in connecting to the cloud service endpoint, the second latency being higher than the first latency;

identifying a change in the second set of network components that can be made by the second client to obtain a latency reduction, based on the latency encountered the using first set of network components; and generating a latency reduction recommendation output to the second client, the latency reduction recommendation output identifying a quantity of latency reduction available to the second client and the identified change in the second set of network components.

Example 11 is the computer implemented method of any or all previous examples wherein identifying a change in the second set of network components comprises:

identifying a change from a first, higher latency, internet service provider (ISP) in the common geographic area to a second, lower latency, ISP in the common geographic area.

Example 12 is the computer implemented method of any or all previous examples wherein identifying a change from a first, higher latency, ISP to a second, lower latency, ISP, comprises:

identifying a plurality of ISPs in the common geographic area that are being used to connect to the cloud service endpoint based on the detected traffic;

detecting a latency corresponding to each of the plurality of ISPs;

determining which of the plurality if ISPs the first and second clients are using based on requests received from the first and second clients at the cloud service endpoint; and identifying the ISP used by the second client as the higher latency ISP and identifying the ISP used by the first client as the lower latency ISP.

Example 13 is the computer implemented method of any or all previous examples wherein identifying a change in the second set of network components comprises:

identifying a change from a first, higher latency, proxy service provider in the common geographic area to a second, lower latency, proxy service provider in the common geographic area.

Example 14 is the computer implemented method of any or all previous examples wherein identifying a change from a first, higher latency, proxy service provider to a second, lower latency, proxy service provider, comprises:

identifying a plurality of proxy service providers in the common geographic area that are being used to connect to the cloud service endpoint based on the detected traffic;

detecting a latency corresponding to each of the plurality of proxy service providers;

determining which of the plurality if proxy service providers the first and second clients are using based on requests received from the first and second clients at the cloud service endpoint; and identifying the proxy service provider used by the second client as the higher latency proxy service provider and identifying the proxy service provider used by the first client as the lower latency proxy service provider.

Example 15 is the computer implemented method of any or all previous examples wherein the first client has a plurality of branch computing systems and wherein detecting a first latency comprises:

detecting a latency encountered by each of the branch computing systems in connecting to the cloud service endpoint.

Example 16 is the computer implemented method of any or all previous examples wherein the branch computing systems connect to the cloud service endpoint through a proxy service provider and wherein detecting a latency encountered by each of the branch computing system comprises:

detecting a backhaul latency for each of the branch computing systems, the backhaul latency comprising a latency of connecting from the branch computing system to the proxy service provider.

Example 17 is the computer implemented method of any or all previous examples and further comprising:

identifying, for each branch computing system, whether a lower latency connection configuration is available; and if so, identifying the lower latency connection configuration for the branch computing system and a quantity of latency reduction corresponding to the lower latency connection configuration.

Example 18 is the computer implemented method of any or all previous examples wherein generating the latency reduction recommendation output comprises:

generating a recommendation output indicative of the quantity of latency reduction and identifying the lower latency connection configuration.

Example 19 is a computer implemented method, comprising:

detecting a plurality of different requests, originating from a common geographic area, at a cloud service endpoint;

detecting a network configuration from which each request originated;

detecting a latency encountered by each network configuration to identify a high latency network configuration having a first latency and a low latency network configuration having a second latency lower than the first latency;

identifying a client that is part of the high latency network configuration;

generating a network configuration recommendation for the identified client, the network configuration recommendation quantifying a reduction in latency available to the identified client by switching to the low latency network configuration; and controlling an interface generator to output the network configuration recommendation for surfacing to the identified client.

Example 20 is the computer implemented method of any or all previous examples wherein the identified client has a plurality of branch computing systems and wherein the branch computing systems connect with the cloud service endpoint through a proxy service provider and wherein detecting a latency encountered by each of the branch computing system comprises:

detecting a backhaul latency for each of the branch computing systems, the backhaul latency comprising a latency of connecting from the branch computing system to the proxy service provider.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
at least one processor; and
a data store storing instructions which, when executed by the at least one processor, cause the at least one processor to perform steps compromising:
   detecting a first latency for a first client, using a first set of network components, in connecting to a cloud service endpoint;
   detecting a second latency for a second client, using a second set of network components, in a common geographic area as the first client, in connecting to the cloud service endpoint using the second set of network components, the second latency being higher than the first latency;
   based on the first latency encountered using the first set of network components, identifying a change in the second set of network components that can be made by the second client to obtain a latency reduction for the second client; and
   generating a latency reduction recommendation output to the second client, the latency reduction recommendation output identifying:
      a quantity of the latency reduction available to the second client, and
      the identified change in the second set of network components.

2. The computer system of claim 1 wherein identifying a change in the second set of network components comprises:
   identifying a change from a first, higher latency, internet service provider (ISP) in the common geographic area to a second, lower latency, ISP in the common geographic area.

3. The computer system of claim 2 wherein identifying a change from a first, higher latency, ISP to a second, lower latency, ISP, comprises:
   identifying a plurality of ISPs in the common geographic area that are being used to connect to the cloud service endpoint based on detected traffic;
   detecting a latency corresponding to each of the plurality of ISPs;
   determining which of the plurality of ISPs the first and second clients are using based on requests received from the first and second clients at the cloud service endpoint; and
   identifying the ISP used by the second client as the first, higher latency, ISP and identifying the ISP used by the first client as the second, lower latency, ISP.

4. The computer system of claim 1 wherein identifying a change in the second set of network components comprises:
   identifying a change from a first, higher latency, proxy service provider in the common geographic area to a second, lower latency, proxy service provider in the common geographic area.

5. The computer system of claim 4 wherein identifying a change from a first, higher latency, proxy service provider to a second, lower latency, proxy service provider, comprises:
   identifying a plurality of proxy service providers in the common geographic area that are being used to connect to the cloud service endpoint based on detected traffic;
   detecting a latency corresponding to each of the plurality of proxy service providers;
   determining which of the plurality of proxy service providers the first and second clients are using based on requests received from the first and second clients at the cloud service endpoint; and identifying the proxy service provider used by the second client as the first, higher latency, proxy service provider and identifying the proxy service provider used by the first client as the second, lower latency, proxy service provider.

6. The computer system of claim 1 wherein the first client has a plurality of branch computing systems and wherein detecting a first latency comprises:

detecting a latency encountered by each of the branch computing systems in connecting to the cloud service endpoint.

7. The computer system of claim 6 wherein the branch computing systems connect to the cloud service endpoint through a proxy service provider and wherein detecting a latency encountered by each of the branch computing system comprises:

detecting a backhaul latency for each of the branch computing systems, the backhaul latency comprising a latency of connecting from the branch computing system to the proxy service provider.

8. The computer system of claim 7 and further comprising:

identifying, for each branch computing system, whether a lower latency connection configuration is available; and if so, identifying the lower latency connection configuration for the branch computing system and a quantity of latency reduction corresponding to the lower latency connection configuration.

9. The computer system of claim 8 wherein generating the latency reduction recommendation output comprises:

generating a recommendation output indicative of the quantity of latency reduction and identifying the lower latency connection configuration.

10. A computer implemented method, comprising:

detecting a first latency for a first client, using a first set of network components, in connecting to a cloud service endpoint;

detecting a second latency for a second client, using a second set of network components, in a common geographic area as the first client, in connecting to the cloud service endpoint using the second set of network components, the second latency being higher than the first latency;

based on the first latency encountered using the first set of network components, identifying a change in the second set of network components that can be made by the second client to obtain a latency reduction; and generating a latancy reduction recommendation output to the second client, the latency reduction recommendation output identifying:

a quantity of the latency reduction available to the second client, and the identified change in the second set of network components.

11. The computer implemented method of claim 10 wherein identifying a change in the second set of network components comprises:

identifying a change from a first, higher latency, internet service provider (ISP) in the common geographic area to a second, lower latency, ISP in the common geographic area.

12. the computer implemented method of claim 11 wherein identifying a change from a first, higher latency, ISP to a second, lower latency, ISP, comprises:

identifying a plurality of ISPs in the common geographic area that are being used to connect to the cloud service endpoint based on detected traffic;

detecting a latency corresponding to each of the plurality of ISPs;

determining which of the plurality of ISPs the first and second clients are using based on requests received from the first and second clients at the cloud service endpoint; and identifying the ISP used by the second client as the first, higher latency, ISP and identifying the ISP used by the first client as the second, lower latency, ISP.

13. The computer implemented method of claim 10 wherein identifying a change in the second set of network components comprises:

identifying a change from a first, higher latency, proxy service provider in the common geographic area to a second, lower latency, proxy service provider in the common geographic area.

14. The computer implemented method of claim 13 wherein identifying a change from a first, higher latency, proxy service provider to a second, lower latency, proxy service provider, comprises:

identifying a plurality of proxy service providers in the common geographic area that are being used to connect to the cloud service endpoint based on detected traffic;

detecting a latency corresponding to each of the plurality of proxy service providers;

determining which of the plurality of proxy service providers the first and second clients are using based on requests received from the first and second clients at the cloud service endpoint; and identifying the proxy service provider used by the second client as the first, higher latency, proxy service provider and identifying the proxy service provider used by the first client as the second, lower latency, proxy service provider.

15. The computer implemented method of claim 10 wherein the first client has a plurality of branch computing systems and wherein detecting a first latency comprises:

detecting a latency encountered by each of the branch computing systems in connecting to the cloud service endpoint.

16. The computer implemented method of claim 15 wherein the, branch computing systems connect to the cloud service endpoint through a proxy service provider and wherein detecting a latency encountered by each of the branch computing system comprises:

detecting a backhaul latency for each of the branch computing systems, the backhaul latency comprising a latency of connecting from the branch computing system to the proxy service provider.

17. The computer implemented method of claim 16 and further comprising:

identifying, for each branch computing system, whether a lower latency connection configuration is available; and if so, identifying the lower latency connection configuration for the branch computing system and a quantity of latency reduction corresponding to the lower latency connection configuration.

18. The computer implemented method of claim 17 wherein generating the latency reduction recommendation output comprises:

generating a recommendation output indicative of the quantity of latency reduction and identifying the lower latency connection configuration.

19. A computer implemented method, comprising:
- detecting a plurality of different requests, originating from a common geographic area, at a cloud service endpoint;
- detecting a network configuration from which each request originated;
- detecting a latency encountered by each network configuration to identify a high latency network configuration having a first latency and a low latency network configuration having a second latency lower than the first latency;
- identifying a client that is part of the high latency network configuration;
- generating a network configuration recommendation for the identified client, the network configuration recommendation quantifying a reduction in latency available to the identified client by switching to the low latency network configuration; and
- controlling an interface generator to output the network configuration recommendation for surfacing to the identified client.

20. The computer implemented method of claim 19 wherein the identified client has a plurality of branch computing systems and wherein the branch computing systems connect with the cloud service endpoint through a proxy service provider and wherein detecting a latency encountered by each of the branch computing system comprises:
- detecting a backhaul latency for each of the branch computing systems, the backhaul latency comprising a latency of connecting from the branch computing system to the proxy service provider.

* * * * *